United States Patent Office 3,313,764
Patented Apr. 11, 1967

3,313,764
RUBBER COMPOSITIONS
Hirokazu Iino, Hyogo-ken, Japan, assignor to Sekaicho Gomu Kabushiki Kaisha, Oyodo-ku, Osaka-shi, Japan
No Drawing. Filed Dec. 24, 1963, Ser. No. 333,211
Claims priority, application Japan, Dec. 29, 1962, 37/59,989
9 Claims. (Cl. 260—41.5)

This invention relates to rubber compositions. More particularly, the invention pertains to the provision of rubber compositions comprising employing a preheated filler while hot.

In manufacturing rubber shoes, rubber tiles and the like rubber products, the so-called filler has been conventionally employed in the order of from at least 40 percent to as much as 250 percent by weight of rubber stock, and the mixture is vulcanized under increased pressure, because vulcanization carried out under atmospheric pressure results in porous compositions, whereby greatly damaging the physical properties, appearances and market value of the resultant articles. Said vulcanization, however, accompanies complicated operations, rendering it almost impracticable to submit said processing to the conveyer system or the like continuous operation. When a closed pressure vessel is employed as is the case with the vulcanization for producing shoes, for instance, the resultant articles are oxidized with a marked deterioration in the physical properties thereof.

One object of the present invention is accordingly to provide a rubber composition which can be vulcanized under atmospheric pressure however large the amount of the filler employed might be.

Another object of the invention is to provide a method for materializing the vulcanization of rubber compositions under atmospheric pressure with no deterioration in the market value of the resultant articles.

A further object of the invention is to provide a rubber composition which can be vulcanized on the conveyer system notwithstanding the filler content present in a relatively large quantity which is required for manufacturing rubber shoes, rubber tiles and the like fabrics.

Other objects and specific features of the invention will become apparent in view of the following:

According to the principles of the present invention, the filler to be employed is preheated at a temperature within the range of from 100° C. to the decomposing point of the filler until each of the particles of the filler is heated to a temperature substantially equal to that of the heat applied, and the resultant filler is milled while hot, that is, while retaining a temperature not lower than 50° C., together with the rubber stock under treatment.

In the present invention, there is employed one or more species in admixture of natural rubbers and styrene-butadiene, nitrile, neoprene, cis-trans-polybutadiene, polyisoprene, butyl and the like synthetic rubbers.

The filler employed in the present invention includes any of the conventional materials, such as basic magnesium carbonate, precipitated calcium carbonate, clay, white carbon, zinc oxide and the like, and the best results can be obtained with those materials having particles in the order of from 0.02 to 10 microns.

In the present invention, the filler to be employed is, as stated before, preheated until each of the particles of the filler is heated to a temperature substantially equal to that of the heat applied. Consequently, the optimal temperature of the heat to be applied and the optimal period of time required for the heat processing vary with the species of the filler to be employed. For instance, basic magnesium carbonate is optimally heated at a temperature from 110° to 150° C. for about one hour, and precipitated calcium carbonate at about 400° C. for about one hour. There can also be employed two or more fillers, in which case the optimal heating temperature and the optimal heating period are also determined in accordance with the aforesaid principle, namely, at a temperature within the range of from 100° C. to the lower or lowest decomposing point of the two or more fillers employed until each of the particles of the fillers is heated to a temperature substantially equal to that of the heat applied.

The aforesaid optimal temperature however is not necessarily strictly limiting the range of temperature of the heat to be applied, since the principles of the present invention can be materialized insofar as heat is applied at a temperature substantially not lower than 100° C., preferably not lower than 105° C. for better results, and not higher than the decomposing point of the filler to be employed until each of the particles of the filler is heated to a temperature substantially equal to that of the heat applied.

In the present invention, the preheated filler is milled while hot, that is, while retaining a temperature not lower than 50° C., in admixture with a rubber stock per se or a rubber composition containing, besides rubber, one or more species of pigments, process oil, vulcanizers and accelerators as conventional in the art. Said range of temperature is a factor quite critical in the invention, since the desired effects of the same can hardly be attained even when, for instance, the preheated filler is allowed to cool to about 40° C. in a desiccator completely protected from the invasion of moisture from the outside. And the results can be improved with a rise in temperature, profitably at a temperature not lower than 70° C.

When the temperature of the preheated filler is too high at the time of admixture, however, the rubber stock admixed therewith undergoes conversion in quality, such as decomposition, turning into a state of gel or premature vulcanization when a vulcanizer is contained in the rubber stock, so that said range of temperature should not exceed the temperature where the rubber content starts undergoing any deterioration in quality as specified above. For instance, the highest temperature allowable for natural, polyisoprene and butyl rubbers should be confined to a temperature not higher than the decomposing point thereof, preferably to about 150° C. The highest temperature allowable for styrene-butadiene, neoprene and cis-trans-polybutadiene rubbers should not exceed the temperature where said rubbers start turning into a gel, so that the temperature is preferably confined to about 130° C. When a gel inhibitor or peptizer is employed, said temperature can be raised to about 160° C. The highest temperature, on the other hand, should be preferably limited to about 110° C. which is the temperature substantially inhibiting the premature vulcanization of a rubber composition containing a vulcanizer, such as sulfur, or a sulfur-forming agent, such as tetramethylthiuram disulfide, tetraethylthiuram disulfide, tetrabutylthiuram disulfide, bis-morpholine disulfide or selenium diethylene dithiocarbamate. When milled with the open rolls, the preheated filler is preferably added while retaining a temperature not lower than the milling temperature applied to the rolls.

Being preheated and applied while hot as stated before, the filler employed in the present invention is completely free from adhesion or sticking to the rolls which is the case with the prior art, and the milling operation is carried out quite profitably within a minimal period of time.

The amount of the filler to be employed in the present invention is dependent upon the species of the desired rubber composition or products and that of the filler to be employed. In this invention, furthermore, vulcanization can be easily carried out under atmospheric pressure even when the filler is employed in the order of 40 percent or more by weight of rubber stock. There are also imparted no damaging effects to the vulcanization processing under atmospheric pressure even when calcium carbonate is added in the order of 250 percent by weight of rubber stock.

It is further known in the art that calcium oxide can prevent the formation of pores to a certain extent when employed in a rubber composition containing a filler in a relatively small quantity. In the present invention can also be employed said oxide in the order of less than 10 percent, preferably from 1 to 8 percent, by weight of rubber stock. Said oxide is added prior to or during or after the application of the preheated filler.

According to the principles of the present invention, the rubber stock milled with a filler preheated and applied in the aforesaid manner is subjected to vulcanization under atmospheric pressure, and the resultant products or compositions are almost completely protected from the formation of pores in the inner and surface layers, so that products, such as rubber shoes, can be manufactured continuously under atmospheric pressure without suspending vulcanization treatment. The principles of the present invention can also be profitably applied to the manufacture of rubber products, such as rubber shoes, rubber tiles and the like, requiring the presence of the filler content in a relatively large quantity.

The theoretical basis of the aforesaid features of the present invention, particularly of the fact that the objects of the same can be successfully achieved by preheating the filler to be employed and milling the resultant filler while hot in admixture with the rubber stock under treatment, is not yet completely known. Apart from said theoretical basis, however, the fact that rubber products can be easily and profitably manufactured under atmospheric pressure when the filler is employed in the aforesaid manner is established for the first time in the art by the present invention.

In the present invention, furthermore, vulcanization is not necessarily confined to atmospheric pressure. The principles of the same can be fully materialized even when vulcanization is carried out under increased pressure.

In order to provide a fuller understanding of the principles of the present invention, there are presented the following examples which are illustrative only and in which all physical properties were determined in accordance with Japanese Industrial Standard K–6,301:

EXAMPLE 1

|  | Grams |
| --- | --- |
| Basic magnesium carbonate | 128.0 |
| ("Tanmagu-T," Tokuyama Soda Mfg. Co., Japan) | |
| Crepe rubber (Ceylon Crepe No. 2) | 100.0 |
| Sulfur | 2.5 |
| Diphenylguanidine (as accelerator) | 0.5 |
| Dibenzothiazyl disulfide (as accelerator) | 1.0 |
| Stearic acid | 1.0 |
| Zinc oxide | 5.0 |

The above components were employed in said weight in the following manner:

The aforesaid Crepe rubber was milled 2 times at a 1.0 mm. clearance or gap with the rolls heated to 60° to 70° C. The resultant sheet was applied by winding to one of the rolls and thoroughly cut back together with accelerators, stearic acid and zinc oxide as specified above. There were then added said sulfur, and the resultant mixture was sheeted out 3 times.

The resultant sheet was again applied by winding to one of the rolls heated to 50° to 60° C. and milled at 1.5 mm. clearance in admixture with said magnesium carbonate which was heated in Gear's oven (an electric thermostat oven) at 150° C. for 60 minutes and added while hot, that is, while retaining about 100° C. The period of time required for milling was reduced to 5 minutes, since the addition of filler while hot completely prevents the filler from sticking to the rolls. After completion of milling, the composition was sheeted out 2.5 mm. thick with the rolls and vulcanized in Gear's oven under atmospheric pressure at 120° C. for 60 minutes, producing a vulcanized rubber sheet exhibiting almost no traces of pores in the inner and surface layers. Physical properties determined were as follows:

| | |
| --- | --- |
| Hardness | 67 |
| 100% Modulus (kg./cm.$^2$) | 45 |
| 300% Modulus (kg./cm.$^2$) | 114 |
| Tensile strength (kg./cm.$^2$) | 137 |
| Ultimate elongation (percent) | 386 |

EXAMPLE 2

150 grams of precipitated calcium carbonate ("Akadama," Shiraishi Industry Co., Japan) were heated in an electric furnace at 400° C. for 60 minutes. The rubber stock consisting of 100 grams of Ceylon Crepe No. 2, 2.5 grams of sulfur, 0.5 gram of diphenylguanidine, 1 gram of dibenzothiazyl disulfide, 1 gram of stearic acid and 5 grams of zinc oxide and prepared in accordance with the same manner as described in Example 1, was applied by winding to one of the rolls heated to 50° to 60° C. and milled with cutting back at a 1.5 mm. clearance in admixture with the aforesaid calcium carbonate which was added while retaining about 110° C. The milling operation was completed in 4 minutes, since the addition of filler while hot completely prevented the filler from sticking to the rolls. The resultant composition was sheeted out 3 mm. thick with the rolls and vulcanized in Gear's oven under atmospheric pressure at 120° C. for 60 minutes, producing a vulcanized rubber sheet exhibiting almost no traces of pores in the inner and surface layers. Physical properties determined were as follows:

| | |
| --- | --- |
| Hardness | 58 |
| 100% modulus (kg./cm.$^2$) | 16.2 |
| 300% modulus (kg./cm.$^2$) | 24.3 |
| Tensile strength (kg./cm.$^2$) | 77.6 |
| Ultimate elongation (percent) | 575 |

EXAMPLE 3

|  | Grams |
| --- | --- |
| Silicon dioxide (hydrated) | 450.0 |
| Basic magnesium carbonate | 150.0 |
| ("Tanmagu-TT," Tokuyama Soda Mfg. Co., Japan) | |
| Clay | 440.0 |
| ("Suprex Clay," J. M. Huber Corp., U.S.A.) | |
| Zinc oxide | 62.5 |
| Titanium dioxide | 125.0 |

The above components were respectively heated in Gear's oven at 110° C. for 120 minutes to be employed as fillers.

The rubber stock employed in the present example was prepared in the following composition:

|  | Grams |
| --- | --- |
| Styrene-butadiene rubber | 1,000.0 |
| (Copolymer consisting by weight of 25% styrene and 75% butadiene) | |
| Sulfur | 25.0 |
| 2-mercaptobenzothiazole (as accelerator) | 15.0 |
| Mixture of dibenzothiazyl disulfide, diphenyl guanidine and hexamethylenetetramine (as accelerator) | 15.0 |
| ("Nocceler F," Ouchi Shinko Chemical Ind. Co., Japan) | |
| Dicyclohexylamine (as activator) | 7.5 |
| Stearic acid | 12.5 |
| Ultramarine | 0.75 |
| Process oil | 200.0 |

The above components were employed in said weight in the following manner:

The aforesaid styrene-butadiene rubber was sheeted out at a 0.2 mm. clearance with the rolls heated to 20° to 30° C. The resultant sheet was applied by winding to one of the rolls, milled at 1.0 mm. clearance with the rolls in admixture of the aforesaid zinc oxide and titanium dioxide added while retaining about 85° C., and thoroughly cut back in admixture with the aforesaid accelerators and stearic acid added thereto.

The resultant sheet was then applied by winding to one of the rolls heated to 30° to 40° C., and there were added the aforesaid silicon dioxide, basic magnesium carbonate and clay while retaining about 85° C. There were further added activator and process oil in weight as specified above, and the mixture was milled at a 2.0 mm. clearance for 30 minutes. The resultant composition was sheeted out 3 times at a 0.5 mm. clearance with the rolls heated to 30° to 40° C. The aforesaid sulfur was then added, and the mixture was thoroughly cut back, sheeted out 4 mm. thick, and vulcanized in Gear's oven under atmospheric pressure at 110° C. for 90 minutes. In the following table are shown physical properties of the resultant sheet in comparison with those of control composition comprising non-preheated filler:

|  | Composition of this invention | Composition comprising non-preheated filler |
|---|---|---|
| Hardness | 62 | 54 |
| 300% Modulus (kg./cm.²) | 39.2 | 30.8 |
| Tensile strength (kg./cm.²) | 66.0 | 49.4 |
| Ultimate elongation (percent) | 510 | 456 |
| Specific gravity | 1.27 | 1.05 |
| Porosity | (¹) | (²) |
| Appearance | (smooth) | (rough) |

¹ Almost non-existent.
² Abundant.

EXAMPLE 4

There were placed in a crucible 100 grams of calcium carbonate ("Akadama," Shiraishi Industry Mfg. Co., Japan) and heated in an eletcric oven at 1,000° C. for 3 hours to substantially convert the $CaCO_3$ content into CaO. The resultant product was stored air tight to prevent invasion of moisture from the outside.

To the rubber stock prepared exactly in accordance with the composition and manner as described in Example 3, there were added 50 grams of the aforesaid CaO following the addition of sulfur, and the mixture was milled, sheeted out and vulcanized in the same manner as described in Example 3, producing a vulcanized rubber sheet exhibiting almost no traces of pores in the inner and surface layers. Physical properties determined were as follows:

Hardness _____ 60
300% modulus (kg./cm.²) _____ 32.1
Tensile strength (kg./cm.²) _____ 71.1
Ultimate elongation (percent _____ 580
Specific gravity (g./cc.) _____ 1.28

EXAMPLE 5

|  | Grams |
|---|---|
| Clay | 1,500 |
| ("Suprex Clay," J. M. Huber Corp., U.S.A.) | |
| Styrene-butadiene rubber | 1,000 |
| (Copolymer consisting by weight of 25% styrene and 75% butadiene) | |
| Sulfur | 20 |
| Mercaptobenzothiazol (as accelerator) | 20 |
| Mixture of dibenzothiazyl disulfide, diphenylguanidine and hexamethylenetetramine (as accelerator) | 50 |
| ("Nocceler F," Ouchi Shinko Chemical Ind. Co., Japan) | |
| Diethylene glycol | 30 |
| Zinc oxide | 50 |
| Stearic acid | 20 |
| Process oil | 100 |
| Titanium dioxide | 20 |

The above components were employed in said weight in the following manner:

The aforesaid styrene-butadiene rubber was sheeted out 5 times at a 0.2 mm. clearance with the rolls heated to 20° to 30° C. The resultant sheet was applied by winding to one of the rolls, thoroughly milled at a 1 mm. clearance in admixture with the aforesaid zinc oxide, stearic acid and accelerators, and cut back for 40 minutes in admixture with the aforesaid filler (clay) preheated in Gear's oven at 150° C. for 8 hours and added while retaining about 120° C. There were then added said diethylene glycol, process oil and titanium dioxide, and the mixture was milled and sheeted out 3 times at a 0.5 mm. clearance with the rolls heated to 30° to 40° C. The resultant sheet was again applied by winding to one of the rolls. Said sulfur was then added, and the mixture was thoroughly milled and cut back. The resultant sheet, 4 mm. thick, was vulcanized under atmospheric pressure at 110° C. for 70 minutes.

In the following table are shown physical properties determined in comparison with control compositions, of which No. 1 is a composition containing non-preheated clay and No. 2 is a composition containing clay preheated but cooled to 25° C. before application:

|  | Composition of this invention | Control No. 1 | Control No. 2 |
|---|---|---|---|
| Hardness | 70 | 69 | 69 |
| 300% Modulus | 40.2 | 36.0 | 37.3 |
| 400% Modulus | 59.1 | 52.2 | 54.8 |
| 500% Modulus | 102.0 | 91.1 | 92.2 |
| Tensile strength | 136.0 | 112.0 | 108.0 |
| Ultimate elongation | 565 | 570 | 537 |
| Porosity | (¹) | Abundant | Abundant |
| Appearance | Smooth | Rough | Rough |

¹ Almost non-existent.

What I claim is:

1. Method of preparing a rubber composition, comprising preheating at least one species of fillers at a temperature ranging from 100° C. to the decomposing point of the filler employed until each of the particles of the filler is heated to a temperature substantially equal to the heat applied; and milling a rubber stock in admixture with the resultant filler added while retaining a temperature ranging from 50° C. to the temperature where the rubber content present in the rubber stock starts undergoing conversion in quality due to the heat of the filler added.

2. Method of preparing a rubber composition, comprising preheating at least one species of fillers at a temperature ranging from 100° C. to the decomposing point of the filler employed until each of the particles of the filler is heated to a temperature substantially equal to the heat applied; and milling a rubber stock in admixture with the resultant filler added while retaining a temperature ranging from 50° C. to the temperature where the rubber content present in the rubber stock starts undergoing deterioration in quality due to the heat of the filler added, said addition of the filler being carried out prior to the application of a vulcanizer.

3. Method of claim 2, wherein the preheated filler is added while retaining a temperature ranging from 50° C. to the decomposing point of the rubber content present in the rubber stock, and said rubber stock comprises at least one species selected from the group consisting of natural, polyisoprene and butyl rubbers.

4. Method of claim 3, wherein the preheated filler is added while retaining a temperature ranging from 70° to 150° C.

5. Method of claim 2, wherein the preheated filler is added while retaining a temperature ranging from 50° C. to the gelling point of the rubber content present in the rubber stock, and said rubber stock comprises at least one species selected from the group consisting of styrene-butadiene, nitrile, neoprene and cis-trans-polybutadiene rubbers.

6. Method of claim 5, wherein the preheated filler is added while retaining a temperature ranging from 70° to 130° C.

7. Method of preparing a rubber composition, comprising preheating at least one species of fillers at a temperature ranging from 100° C. to the decomposing point of the filler employed until each of the particles of the filler is heated to a temperature substantially equal to the heat applied; and milling a rubber stock in admixture with the resultant filler added while retaining a temperature ranging from 50° C. to the vulcanizing point of the rubber stock, said rubber stock containing at least one species of vulcanizers selected from the group consisting of sulfur and sulfur-forming agents selected from the group consisting of tetramethylthiuram disulfide, tetraethylthiuram disulfide, tetrabutylthiuram disulfide, bis-morpholine disulfide and selenium diethylene dithiocarbamate.

8. Method of claim 7, wherein the preheated filler is added while retaining a temperature ranging from 70° to 110° C.

9. Method of manufacturing a vulcanized rubber product, comprising preheating at least one species of fillers at a temperature ranging from 100° C. to the decomposing point of the filler employed until each of the particles of the filler is heated to a temperature substantially equal to the heat applied, milling a rubber stock in admixture with the resultant filler added while retaining a temperature ranging from 50° C. to the temperature where the rubber content present in the rubber stock starts undergoing conversion in quality due to the heat of the filler added, molding the resultant mixture into a desired shape and vulcanizing, in the presence of a vulcanizer, the resultant molding at 90° to 150° C. under atmospheric pressure.

References Cited by the Examiner
UNITED STATES PATENTS

| | | | |
|---|---|---|---|
| 2,914,503 | 11/1959 | Pechukas | 260—41.5 |
| 3,024,092 | 3/1962 | Gessler | 260—41.5 |

MORRIS LIEBMAN, *Primary Examiner.*

J. S. WALDRON, *Assistant Examiner.*